Jan. 26, 1965 K. M. ST. JOHN 3,167,611

COLOR-TELEVISION APPARATUS FOR IMPROVING RESOLUTION DURING MONOCHROME RECEPTION

Filed March 25, 1960 2 Sheets-Sheet 1

United States Patent Office 3,167,611
Patented Jan. 26, 1965

3,167,611
COLOR-TELEVISION APPARATUS FOR IMPROVING RESOLUTION DURING MONOCHROME RECEPTION
Karl M. St. John, Hicksville, N.Y., assignor to Hazeltine Research, Inc., a corporation of Illinois
Filed Mar. 25, 1960, Ser. No. 17,600
9 Claims. (Cl. 178—5.4)

Figure 1:
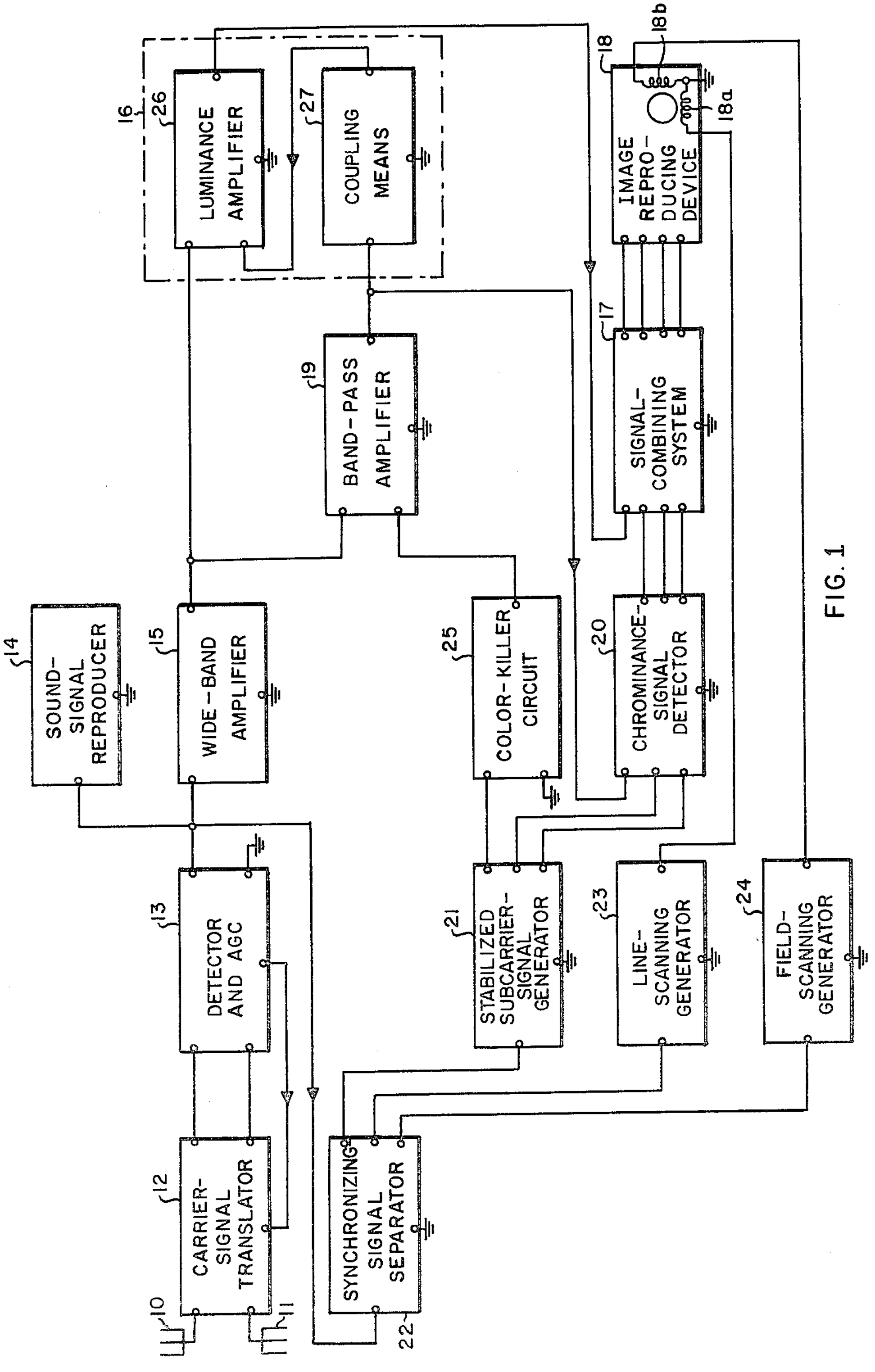

This invention relates to compatible color-television receivers and, more particularly, to a compatible color-television apparatus for improving resolution during monochrome reception. In this specification the terms "luminance channel" and "monochrome channel" are used interchangeably.

The invention will be described with reference to the well known NTSC television system now in use in the United States. In this system a wide band width signal (having a band width of approximately 4 megacycles) representative of the luminance of a scene is combined with a narrower band width signal representative of the chrominance, this latter signal being included as a subcarrier wave signal (nominally 3.58 megacycles) to produce a composite video frequency signal which is used to modulate the transmitter output.

A receiver in such a television system intercepts a radiated signal and derives the described composite video frequency signal, including the luminance and chrominance signals, therefrom. One type of such receiver includes a pair of principal channels for individually translating the luminance and chrominance information for application to an image-reproducing device in such receiver. The channel for translating the luminance signals is substantially the same as the video-frequency amplifier stages of a conventional monochrome receiver. The principal difference is that the band width of the luminance or monochrome channel of a color receiver must be limited to prevent the chorminance subcarrier signals from passing through the luminance channel and thereby degrading the reproduced image. Thus, in previous compatible color-television receivers the necessity for limiting the band width of the luminance or monochrome channel during color reception has resulted in a substantially identical limiting of the monochrome channel band width during monochrome reception. The result is that existing compatible color receivers do not utilize fully the received monochrome signal and as a result reproduce received monochrome images with less horizontal resolution than a quality monochrome receiver.

It is, therefore, an object of the present invention to provide a new and improved compatible color-television apparatus in which the deficiencies of prior such systems are diminished.

It is an additional object of the present invention to provide a compatible color-television apparatus which makes possible improved resolution during monochrome reception.

It is another object of this invention to provide a compatible color-television apparatus of relatively simple construction which makes possible a reproduced monochrome image of improved quality and which is capable of utilizing the current standard television signals.

In accordance with the invention a compatible color-television apparatus for improving resolution during monochrome reception comprises a wide band-width monochrome channel, means for supplying a signal similar to undesirable chrominance signals and means for coupling the aforementioned signal into the channel so that the undesirable chrominance signals are substantially deleted from the channel.

For a better understanding of the present invention, together with other and further objects thereof, reference is had to the following description, taken in connection with the accompanying drawings, and its scope will be pointed out in the appended claims.

Figure 2:
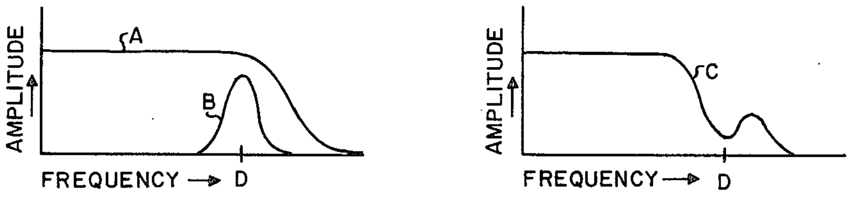
Figure 3:
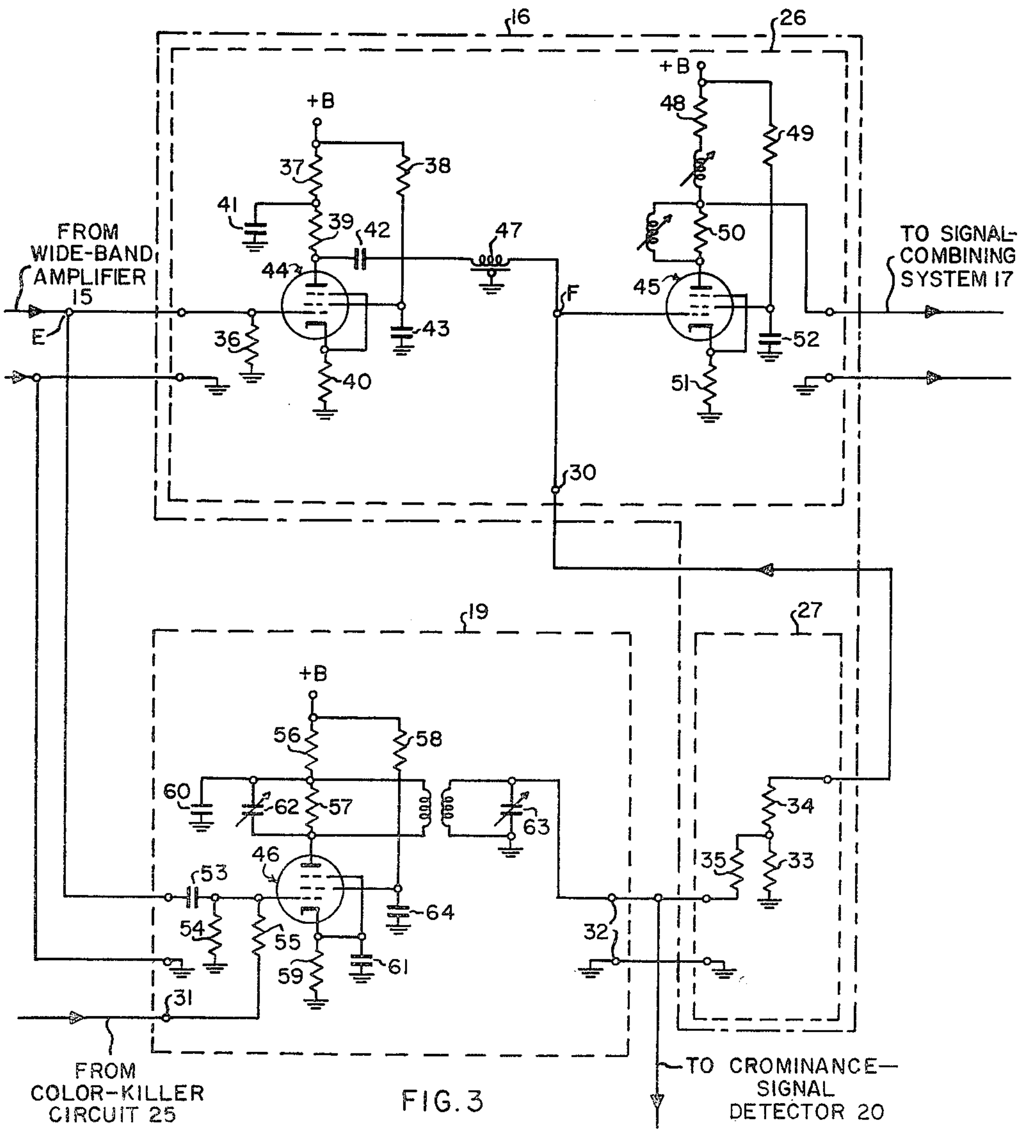

Referring to the drawings:

FIG. 1 is a circuit diagram of a complete compatible color-television receiver including apparatus for improving resolution during monochrome reception constructed in accordance with the present invention;

FIG. 2 comprises curves helpful in understanding the operation of the invention, and FIG. 3 is a schematic diagram of a specific embodiment of the invention.

*Description and operation of FIG. 1 color-television receiver*

Referring to the drawings, the color-television receiver there represented comprises an antenna system 10, 11 of conventional construction for supplying a received composite color-television signal to a carrier-signal translator 12. The carrier-signal translator 12 may include, for example, a radio-frequency amplifier, an oscillator-modulator, and an intermediate-frequency amplifier, all of conventional construction. These units serve to amplify the received composite signal and change its carrier frequency to an intermediate-frequency value.

The intermediate-frequency composite signal is then supplied to a detector and AGC unit 13 of conventional construction. The AGC portion of unit 13 is effective to supply a control voltage to appropriate stages of the carrier-signal translator 12 for controlling the gain of those stages in a conventional manner. The detector portion of unit 13 serves to extract the composite video-frequency signal including an intercarrier type sound signal from the intermediate-frequency composite signal and supply the signal to sound-signal reproducer 14. The intercarrier sound signal is then amplified and detected in the reproducer 14 to develop sound-signal modulation components which may then be further amplified and utilized to reproduce sound in a conventional manner. The composite signal is also supplied to wide-band amplifier 15 which is of conventional design and which in turn supplies the amplified composite video signal to apparatus 16 constructed in accordance with the present invention as will be described more fully hereinafter. Signals appearing at the output of apparatus 16 are then coupled to a conventional signal-combining system 17, which connects to image-reproducing device 18 which may be a conventional color picture tube.

The color-television receiver also includes a chrominance-signal channel for translating the chrominance-signal component of the composite video signal supplied by the amplifier 15, the chrominance-signal channel including a band-pass amplifier 19, of conventional construction, which in turn is coupled in cascade with a chrominane signal detector 20 and a portion of the signal-combining system 17. Amplifier 19 is also coupled to apparatus 16, as will be described more fully below. The chrominance signal detector may include, for example, a pair of synchronous detectors for deriving the desired red and blue color-difference signals from the chrominance signal supplied thereto by the band-pass amplifier 19. Coupled to the chrominance signal detector 20 is a stabilized subcarrier signal generator 21 which is effective to supply properly phased subcarrier reference signals to the synchronous detectors of the chrominance signal detector 20 for enabling the detection of the color-difference signals. The color-difference signals from the detector 20 are supplied to the signal-mombining system 17 which is effective to combine the color-difference signals and luminance signal to derive the desired red, green and blue color signals which in turn are supplied to the corresponding control electrodes of the picture tube 18.

The composite video signal from the detector 13 is also supplied to a synchronizing-signal separator 22 which is effective to separate the subcarrier-synchronizing, the line-synchronizing, and field-synchronizing signal components from the composite video signal and from each other. The line-synchronizing component is supplied to a conventional line-scanning generator 23 and is effective to control generation of suitable recurrent line-scanning signals therein. The line-scanning signals are in turn supplied to an appropriate horizontal deflection winding 18*a* associated with the picture tube 18. In a like manner, the field-synchronizing signals are supplied to a conventional field-scanning generator 24 and are effective to control generation of field-scanning signals therein, which in turn are supplied to an appropriate vertical deflection winding 18*b* also associated with the picture tube 18. The subcarrier-synchronizing component is supplied to the subcarrier-signal generator 21 in order to properly synchronize the phase of the subcarrier reference signals generated therein.

An output signal of the stabilized subcarrier signal generator 21 is also employed in the color-killer circuit 25 to develop a color-killer bias potential which renders the band-pass amplifier 19 nonconductive except when color signals are being received.

The antenna system 10, 11 and the units 12–25, inclusive, with the exception of the signal-modifying apparatus 16, may be of conventional construction and operation so that a detailed description and explanation of the operation thereof are unnecessary herein.

*Description and operation of apparatus* 16

Referring now to apparatus 16 of FIG. 1 there is illustrated a compatible color-television apparatus for improving resolution during monochrome reception. This apparatus includes a wide band-width monochrome channel shown as luminance amplifier 26 which receives wide-band video information from amplifier 15 and supplies amplified monochrome signals to signal-combining system 17. Luminance amplifier 26 may be of generally conventional design—the variations from conventional design being described in detail hereinafter.

The apparatus further includes means for preventing the passage of undesirable chrominance signals. For the purposes of this specification, the term "undesirable chrominance signals" is intended to refer generally to chrominance information which enters the luminance channel of a color receiver along with the luminance information signals. More specifically the term refers to the portion of the chrominance information which, if allowed to pass through a wide band-width luminance channel, would produce undesirable or objectionable degradation of the reproduced image. This portion normally includes the chrominance signal subcarrier and the major side-band components associated with this subcarrier.

These means which may be in the form of means for supplying a signal similar to the undesirable chrominance signals are illustrated as the connection between the restricted band-width chrominance amplifier 19 in the chrominance channel and coupling means 27. This connection supplies a signal similar to the undesirable chrominance signals to coupling means 27 only during color reception.

The apparatus also includes means for effectively coupling the above-mentioned means to the channel. These means are shown as coupling means 27 which connects to luminance amplifier 26 and thereby couples the signal described above into the monochrome channel so as to substantially delete undesirable chrominance signals.

The principle of operation of the apparatus illustrated could be simply described as follows. Wide band-width video signals are coupled to the wide band-width amplifier 26 (from amplifier 15) which amplifies these signals substantially without change in band width and supplies the amplified signals to signal-combining system 17. During monochrome reception this allows full utilization of the received monochrome signal at the picture tube. However, if such a result were allowed to occur during color reception, the chrominance signals would produce serious picture degradation as they traveled through the luminance channel and modulated the resulting reproduced image. These signals would travel through the luminance channel because their frequencies are within its band width. Therefore, during color reception, chrominance signals from the chrominance channel are coupled into the luminance or monochrome channel 180° out of phase with the chrominance information existing in this channel and the chrominance information is effectively cancelled out of the luminance channel by the addition of these two signals.

Thus, with reference to FIG. 2, Curve A represents the frequency response of amplifier 26 with no signals supplied to amplifier 26 by coupling means 27. This response is effective to pass substantially all video information received and represents an ideal monochrome frequency response. Curve B, in which frequency D is the chrominance subcarrier frequency, represents the frequency response of amplifier 19. This response is effective to supply chrominance information similar to that supplied in an inexpensive color receiver. Curve C represents the resulting frequency response of amplifier 26 when the information supplied by amplifier 19 to coupling means 27 (represented by Curve B) is coupled into amplifier 26, 180° out of phase with the chrominance information already appearing in amplifier 26. This response is effective to make possible a color picture without luminance degradation by chrominance information.

Referring now to FIG. 3 there is shown a specific embodiment of apparatus 16 of FIG. 1 and an example of specific circuitry of amplifier 19 of FIG. 1. Amplifiers 19 and 26 are generally of conventional design (with the exception of the connection from terminal 30 to point F of amplifier 26) so that little description is required. This embodiment is included to illustrate, by means of actual circuitry, the simplicity possible in the use of the present invention.

In this circuit, amplifier 26 has a response similar to Curve A of FIG. 2 when no signal appears at terminal 30. Amplifier 19 has a response similar to Curve B of FIG. 2 during color reception. During monochrome reception signals supplied to terminal 31 from color-killer circuit 25 are effective to disable amplifier 19 so that no signals appear at terminals 32.

Through proper design, chrominance signals originating at point E and arriving at terminals 32 are 180° out of phase with chrominance signals which originate at point E and arrive at point F. It will be appreciated that, in addition to actual phase shift considerations, the design must insure that the signal delay encountered in each path is substantially equal. Therefore, in order to accomplish cancellation of the chrominance signals in amplifier 26 in this example, coupling means 27 is required only to insure that signals arriving at terminal 30 are of the same magnitude as signals appearing at point F. To this end, means 27 comprises two resistors 33 and 34 to provide voltage division and resistor 35 to provide some degree of isolation.

Following is a list of circuit constants which have been found suitable in the embodiment of the invention illustrated in FIG. 3:

| | |
|---|---|
| Resistor 33 | 680 ohms. |
| Resistor 34 | 470 ohms. |
| Resistor 35 | 10 kilohms. |
| Resistor 36 | 470 kilohms. |
| Resistor 37 | 8200 ohms. |
| Resistor 38 | 56 kilohms. |

| | |
|---|---|
| Resistor 39 | 1200 ohms. |
| Resistor 40 | 270 ohms. |
| Capacitor 41 | 8 microfarads. |
| Capacitor 42 | 40 microfarads. |
| Capacitor 43 | 10 microfarads. |
| Valves 44, 45, 46 | Type 6CB6 vacuum tube. |
| Delay line 47 | 1100 ohms. |
| Resistor 48 | 3200 ohms. |
| Resistor 49 | 27 kilohms. |
| Resistor 50 | 33 kilohms. |
| Resistor 51 | 56 ohms. |
| Capacitor 52 | 8 microfarads. |
| Capacitor 53 | 30 micromicrofarads. |
| Resistors 54, 55, 56, 57 | 10 kilohms. |
| Resistor 58 | 50 kilohms. |
| Resistor 59 | 180 ohms. |
| Capacitors 60, 61 | .047 microfarad. |
| Capacitors 62, 63 | 7–45 micromicrofarads. |
| Capacitor 64 | 1000 micromicrofarads. |

It will be appreciated that the design of FIG. 3 is a compromise design applicable to low cost receivers. Thus, the response of amplifier 19 is a compromise between the desire for a wide band-width chrominance signal to supply to detector 20 and a desire to narrow the luminance channel only as much as is absolutely required. In application of the invention to more expensive receivers it should be appreciated that amplifier 19 can be designed to supply chrominance signals of as wide a band width as desired for a picture having high quality chrominance reproduction. In this case coupling means 27 would include a filter, of conventional design, effective to limit the narrowing of the luminance response to a minimum, by passing only enough of the chrominance information to effectively delete undesirable chrominance signals from the luminance channel.

In other applications it may be desirable to design luminance and chrominance amplifiers which do not include easily accessible circuit points where the chrominance phase relationships are as required by this invention. (Such points do appear in the FIG. 3 arrangement as point F and terminals 32 at which points the phase shift with relation to point E is as required.) In such a case coupling means 27 would include a phase shift device of conventional design so as to provide a chrominance signal 180° out of phase with that existing at a selected point in the luminance channel.

Thus, there is made possible a compatible color-television receiver having improved resolution during monochrome reception while still retaining excellent color reception capabilities, this improved resolution being possible at very little cost in components additional to those required by normal receiver design.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A compatible color-television apparatus for improving resolution during monochrome reception comprising: a wide band-width monochrome channel; means for supplying a signal similar to undesirable chrominance signals; and means for coupling said signal into said channel so that said undesirable chrominance signals are substantially deleted from said channel.

2. A compatible color-television apparatus for improving resolution during monochrome reception comprising: a wide band-width monochrome channel; means for supplying a signal similar to undesirable chrominance signals; and means for coupling said signal into said channel only during color reception so that said undesirable chrominance signals are substantially deleted from said channel.

3. A compatible color-television apparatus for improving resolution during monochrome reception comprising: a wide band-width monochrome channel; means for supplying a signal similar to undesirable chrominance signals; and means for coupling said signal into said channel only during color reception so that additive cancellation of undesirable chrominance signals occurs.

4. A compatible color-television apparatus for improving resolution during monochrome reception comprising: a wide band-width monochrome channel; means for supplying a signal similar to undesirable chrominance signals; and means for coupling said signal into said channel during color reception with substantially opposite phase and equal amplitude as compared to said undesirable chrominance signals existing in said channel.

5. A compatible color-television apparatus for improving resolution during monochrome reception comprising: a wide band-width monochrome channel; means for supplying a signal similar to the portion of a chrominance signal which would cause degradation of a reproduced image if allowed to pass through said channel; and means for coupling said signal into said channel only during color reception so that said portion of the chrominance signals is substantially deleted.

6. A compatible color-television apparatus for improving resolution during monochrome reception comprising: a wide band-width monochrome channel; a restricted band-width chrominance channel; and means for coupling signals from said chrominance channel into said monochrome channel during color reception so as to substantially delete undesirable chrominance signals from said monochrome channel.

7. A compatible color-television apparatus for improving resolution during monochrome reception comprising: a wide band-width monochrome channel; a restricted band-width chrominance channel activated only during color reception; and means for coupling a portion of the signals from said chrominance channel into said monochrome channel so as to substantially delete undesirable chrominance signals from said monochrome channel.

8. A compatible color-television apparatus for improving resolution during monochrome reception comprising: a wide band-width monochrome channel; a restricted band-width chrominance channel activated only during color reception; and means for coupling signals from said chrominance channel into said monochrome channel so that said coupled signals are of substantially opposite phase as compared to undesirable chrominance signals so as to substantially delete undesirable chrominance signals from said monochrome channel.

9. A compatible color-television apparatus for improving resolution during monochrome reception comprising: a wide band-width monochrome channel; a restricted band-width chrominance channel; and means for coupling signals from said chrominance channel into said monochrome channel during color reception so that said coupled signals are of substantially opposite phase as compared to undesirable chrominance signals so as to substantially delete undesirable chrominance signals from said monochrome channel during color reception, while leaving the wide band-width of the luminance channel unaltered during monochrome reception.

References Cited in the file of this patent

UNITED STATES PATENTS

| | | |
|---|---|---|
| 2,791,627 | Thomas et al. | May 7, 1957 |
| 2,854,508 | Janssen | Sept. 30, 1958 |
| 2,884,485 | Shlachter | Apr. 28, 1959 |
| 2,895,004 | Fredendall | July 14, 1959 |
| 2,905,751 | Ralston | Sept. 22, 1959 |
| 2,910,528 | Petersen | Oct. 27, 1959 |
| 2,924,651 | Loughlin | Feb. 9, 1960 |

FOREIGN PATENTS

| | | |
|---|---|---|
| 842,512 | Great Britain | July 27, 1960 |